US012569816B2

(12) United States Patent
Dorbec et al.

(10) Patent No.: US 12,569,816 B2
(45) Date of Patent: Mar. 10, 2026

(54) CERAMIC NANOFILTRATION MEMBRANE WITH POLYMERS GRAFTED INTO THE PORES AND METHOD OF PRODUCING SAME

(71) Applicant: VITO NV, Mol (BE)

(72) Inventors: Matthieu Dorbec, Mol (BE); Anita Buekenhoudt, Mol (BE); Maider Coloma Jimenez, Mol (BE); Pieter Vandezande, Mol (BE)

(73) Assignee: VITO NV, Mol (BE)

( * ) Notice: Subject to any disclaimer, the term of this patent is extended or adjusted under 35 U.S.C. 154(b) by 1073 days.

(21) Appl. No.: 17/260,444

(22) PCT Filed: Jul. 9, 2019

(86) PCT No.: PCT/EP2019/068458
§ 371 (c)(1),
(2) Date: Jan. 14, 2021

(87) PCT Pub. No.: WO2020/016068
PCT Pub. Date: Jan. 23, 2020

(65) Prior Publication Data

US 2021/0268451 A1 Sep. 2, 2021

(30) Foreign Application Priority Data

Jul. 19, 2018 (EP) .................................... 18184449

(51) Int. Cl.
*B01D 69/14* (2006.01)
*B01D 61/02* (2006.01)
(Continued)

(52) U.S. Cl.
CPC ......... *B01D 69/148* (2013.01); *B01D 61/027* (2013.01); *B01D 67/0079* (2013.01);
(Continued)

(58) Field of Classification Search
CPC ............ B01D 2239/10; B01D 2239/00; B01D 2239/02; B01D 2239/04; B01D 2239/08;
(Continued)

(56) References Cited

U.S. PATENT DOCUMENTS

2004/0191421 A1* 9/2004 Huang .................. B05D 1/185 442/59
2011/0105712 A1* 5/2011 Jiang .................. G01N 33/6845 528/26
(Continued)

FOREIGN PATENT DOCUMENTS

CN 103205202 A * 7/2013
EP 2055226 A1 5/2009
(Continued)

OTHER PUBLICATIONS

Merlet, R.B., Amirilargani, M., de Smet, L.C., Sudholter, E.J., Nijmeijer, A. and Winnubst, L., 2019. Growing to shrink: Nanotunable polystyrene brushes inside 5 nm mesopores. Journal of membrane science, 572, pp. 632-640 (Year: 2018).*
(Continued)

*Primary Examiner* — Magali P Slawski
*Assistant Examiner* — Bernadette Karen Mcgann
(74) *Attorney, Agent, or Firm* — Kolitch Romano Dascenzo Gates LLP

(57) ABSTRACT

The present disclosure relates to a nanofiltration membrane and a method of manufacturing a nanofiltration membrane. The method includes providing a support structure having a first mesoporous layer made of $TiO_2$ and/or $ZrO_2$ and a second porous layer adjacent to the mesoporous layer made of aluminum oxide. The method further includes grafting an anchoring group within pores of the first mesoporous layer, wherein the second layer is inert to the grafting step. An initiator for a surface-initiated atom transfer radical polym-
(Continued)

erization (SI-ATRP) reaction is covalently bonded to the anchoring group. The support structure is impregnated with a monomer and a solvent, and a polymerization reaction is performed, which includes passing a catalyst through the mesoporous layer, the monomer being configured to start the polymerization reaction by grafting from the initiator in the presence of the catalyst.

11 Claims, 6 Drawing Sheets

(51) Int. Cl.

| | |
|---|---|
| ***B01D 67/00*** | (2006.01) |
| ***B01D 69/10*** | (2006.01) |
| ***B01D 69/12*** | (2006.01) |
| ***B01D 71/02*** | (2006.01) |
| ***B01D 71/78*** | (2006.01) |

(52) U.S. Cl.
CPC ....... *B01D 69/108* (2022.08); *B01D 69/1214* (2022.08); *B01D 69/125* (2013.01); *B01D 71/024* (2013.01); *B01D 71/78* (2013.01); *B01D 2323/283* (2013.01); *B01D 2323/38* (2013.01); *B01D 2323/40* (2013.01); *B01D 2323/46* (2013.01); *B01D 2323/50* (2013.01)

(58) Field of Classification Search
CPC .. B01D 61/027; B01D 61/0271; B01D 39/08; B01D 39/00; B01D 67/00931; B01D 2323/38
See application file for complete search history.

(56) References Cited

U.S. PATENT DOCUMENTS

| | | | | |
|---|---|---|---|---|
| 2012/0012528 | A1 * | 1/2012 | Buekenhoudt | ..... B01D 67/0093 210/660 |
| 2014/0231351 | A1 | 8/2014 | Wickramasighe et al. | |

FOREIGN PATENT DOCUMENTS

| | | | | | |
|---|---|---|---|---|---|
| EP | 2055369 | A1 * | 5/2009 | ........... A61B 5/0031 |
| JP | 06502116 | A | 3/1994 | |
| JP | 06142476 | A | 5/1994 | |
| JP | 06238140 | A | 8/1994 | |
| JP | 2011162718 | A | 8/2011 | |
| JP | 2012532966 | | 12/2012 | |
| JP | 2016182690 | A | 10/2016 | |
| WO | 1999040996 | | 8/1999 | |
| WO | WO-9940996 | A1 * | 8/1999 | ......... B01D 67/0088 |
| WO | WO2018075457 | A1 | 4/2018 | |

OTHER PUBLICATIONS

Merlet, Renaud B., et al.; "Growing to shrink: Nano-tunable polystyrene brushes inside 5 nm mesopores"; Journal of Membrane Science, Nov. 24, 2018.

European Patent Office, International Search Report and Written Opinion of the International Searching Authority, dated Sep. 9, 2019, in PCT/EP2019/068458, which is the international application to this U.S. application.

* cited by examiner

CERAMIC NANOFILTRATION MEMBRANE WITH POLYMERS GRAFTED INTO THE PORES AND METHOD OF PRODUCING SAME

TECHNICAL FIELD

The present disclosure is related to a ceramic nanofiltration membrane and to a method of manufacturing said membrane.

INTRODUCTION

It is known that nanofiltration membranes comprise a nanofiltration layer which is grown on top of a backbone, which typically is an ultrafiltration membrane. Most nanofiltration membranes are completely polymeric, particularly both the backbone and the nanofiltration layer. As a result, these nanofiltration membranes cannot be used for high temperature applications.

For a number of applications, in particular in chemical processes, it is desired to use nanofiltration membranes having a fair resistance to elevated temperatures, such as temperatures of 100° C.-150° C. and above.

SUMMARY

According to a first aspect, there is therefore provided a method of manufacturing a nanofiltration membrane as set out herein.

In particular, the membrane comprises a ceramic backbone and a mixed ceramic/polymeric nanofiltration layer. The nanofiltration membrane is made starting from a layered porous support, which comprises, or consists of, a first, mesoporous layer made of titanium oxide and/or zirconium oxide and a second (backbone) layer made of another advantageously ceramic material, such as though not limited to aluminum oxide. The first and second layers are attached to one another. Advantageously, the first, mesoporous layer forms a superficial layer of the porous support, i.e., is located at an external surface of the support.

In following steps, a polymer is made to grow in the first mesoporous layer through a polymerization reaction which grafts from the walls of the pores of the first layer, i.e. grafts from the ceramic $TiO_2$ and/or $ZrO_2$ material, while no polymer is grown in the backbone layer. This is surprisingly made possible by proper selection of materials of the layered support and/or proper selection of the anchoring and/or initiator groups which allow for grafting or covalently bonding to the ceramic material of the first mesoporous layer, while the material of the second layer is inert to this grafting or bonding reaction. By so doing, a subsequent polymerization reaction can be made to proceed from the anchoring/initiator group only and therefore will proceed only in the first mesoporous layer, while the second backbone layer remains free of any polymer.

As the polymer grows inside the pores of the mesoporous layer, the pores (of the ceramic matrix) get filled with polymer and the void space shrinks. The polymerization reaction is advantageously carried out in presence of a catalyst, allowing to easily stop the polymerization reaction by deactivating the catalyst, e.g., by flushing with a deactivating agent, such as oxygen or air.

The use of a catalyst is furthermore advantageous since it allows to control where the polymerization reaction will start. The catalyst is supplied advantageously in a liquid mixture, such as a solvent. The catalyst can be injected at precise locations, e.g., at one side of the support or the first mesoporous layer, from where it can be made to spread out throughout the first layer, e.g., by sustaining a flow through the porous support, or by diffusion due to a concentration gradient. By so doing, it becomes possible to let the polymerization reaction start from the inside of the mesoporous layer, e.g., at the interface with the second layer and progress towards the opposite side, which can be an external surface of the porous support. This allows for reducing the amount of polymerization occurring at the external surface, which is beneficial for maintaining high fluxes for the nanofiltration layer.

Both dense and porous nanofiltration layers can be obtained with methods of the present disclosure.

According to a second aspect, there is provided a nanofiltration membrane as set out herein.

BRIEF DESCRIPTION OF THE FIGURES

Aspects of the present disclosure will now be described in more detail with reference to the appended drawings, wherein same reference numerals illustrate same features.

DETAILED DESCRIPTION

Methods of manufacturing a nanofiltration membrane according to aspects of the present disclosure include the steps of providing a support structure comprising a first mesoporous layer made of $TiO_2$ and/or $ZrO_2$ and a second porous layer adjacent to the mesoporous layer made of a material different from $TiO_2$ and/or $ZrO_2$, in particular aluminum oxide. An anchoring group is grafted within pores of the first mesoporous layer, wherein the second layer is inert to the grafting step. An initiator for a surface initiated atom transfer radical polymerization reaction is covalently bonded to the anchoring group. The support structure is impregnated with a monomer and a solvent. The monomer is preferably compatible with the surface initiated atom transfer radical polymerization reaction. A polymerization reaction is performed, comprising passing feed comprising a catalyst through the mesoporous layer, the monomer being configured to start the polymerization reaction by grafting from the initiator in the presence of the catalyst.

Figure 1:
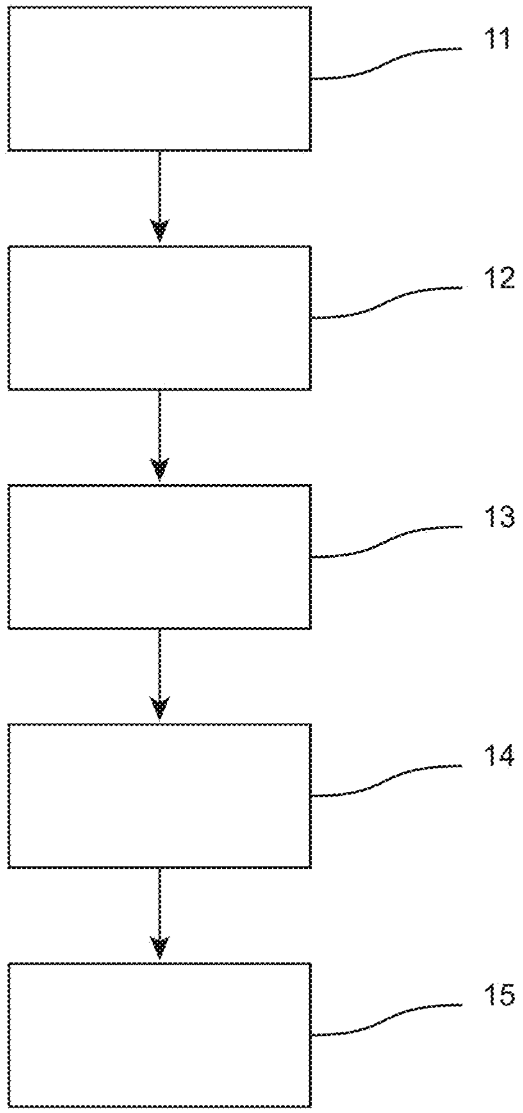
FIG. 1 represents a flow diagram of processes according to the present disclosure.
Figure 2:
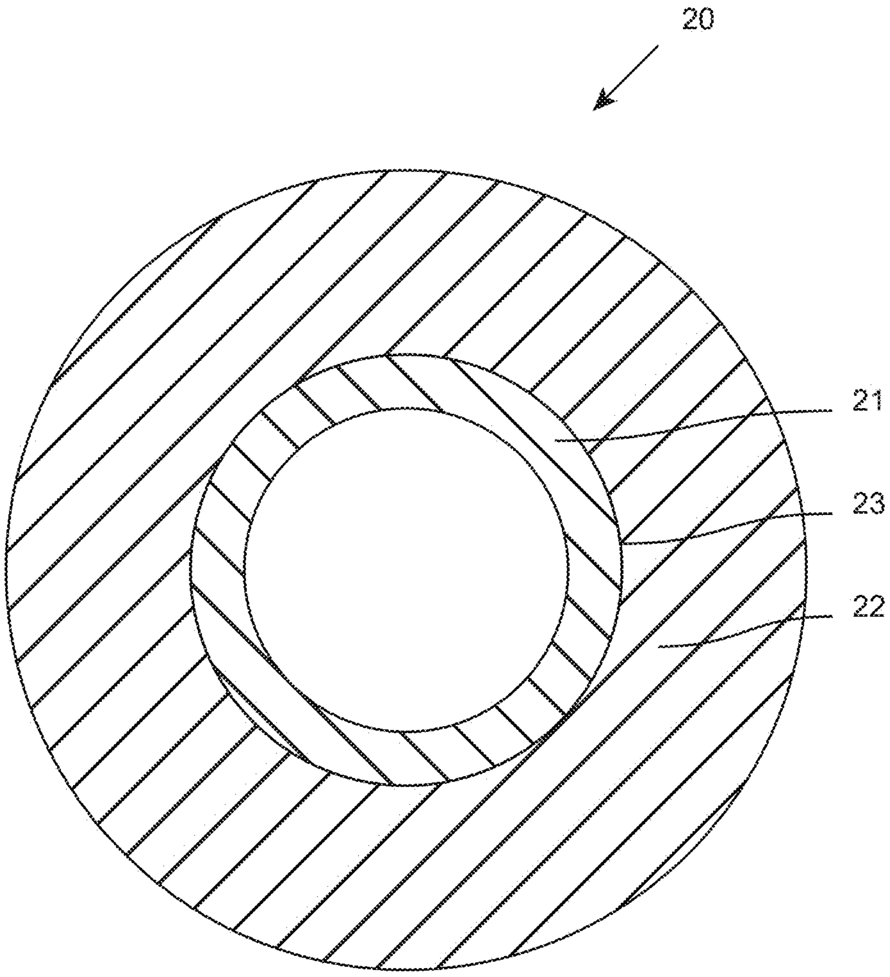
FIG. 2 represents a cross section of a layered support structure useful in processes according to the present disclosure.

Referring to FIG. 1, processes according to aspects of the disclosure comprise a first step 11 in which a layered support structure is provided. Referring to FIG. 2 the layered support structure 20 comprises a first mesoporous layer 21 made of $TiO_2$ and/or $ZrO_2$ and a second porous layer 22 adjacent to, and advantageously attached to, the mesoporous layer 21. The second layer is made of a material different from $TiO_2$ and/or $ZrO_2$, advantageously a different ceramic material, e.g., aluminum oxide. Advantageously the first layer 21 and the second layer 22 make contact at a common interface 23. In FIG. 2, the porous structure 20 is shown as a tubular membrane for illustration purposes only. Other shapes of porous support structures, such as planar structures, can be contemplated.

The first layer 21 is mesoporous. A mesoporous material is a material containing pores with diameters between 2 and 50 nm, according to IUPAC nomenclature. For comparison, IUPAC defines microporous material as a material having pores smaller than 2 nm in diameter and macroporous material as a material having pores larger than 50 nm in diameter. Mesoporosity advantageously ensures a good diffusion and a homogeneous grafting in subsequent process steps that are described herein below.

The second layer 22 is also porous. Layer 22 can be mesoporous, just like layer 21. Alternatively, layer 22 can have a larger porosity, e.g., layer 22 can be macroporous.

Advantageously, the second porous layer is made of a ceramic material, advantageously aluminum oxide.

The porous structure 20 is advantageously a ceramic ultrafiltration membrane, in particular one having a $TiO_2$ and/or $ZrO_2$ ultrafiltration layer. Particularly suitable membranes are tubular (mono/multichannel(s)) membranes.

According to aspects of the present disclosure, the porous structure 20 is subjected to a Surface-Initiated Atom Transfer Radical Polymerization (SI-ATRP) in order to allow growing a nanofiltration layer within the first mesoporous layer 21. The SI-ATRP process is advantageously applied according to the "grafting-from" method.

Reversible-deactivation radical polymerization (RDRP) or controlled radical polymerization (CRP) is a method to suppress chain transfer and termination and solve the problem of uncontrolled nature of conventional radical polymerization. ATRP, otherwise known as Atom Transfer Radical Polymerization, is one of the CRP processes that employs reversible deactivation of radicals to form a dormant species that can later be reactivated. It is a widespread CRP technique that can be used to assemble a polymer piece-by-piece with tailor functionalities for specific properties.

SI-ATRP, or Surface Initiated Atom Transfer Radical Polymerization, is a specific kind of ATRP. The polymerization reaction still follows the pathway of ATRP, but an important spatial restriction is present in this method. SI-ATRP is a grafting method based on the formation of a polymer when starting from a surface. This method is often called "grafting from" in literature. Another type of grafting method exists. It is called "grafting to" or "grafting onto" and follows a different strategy. When using the grafting from-method, a preparation of the surface is needed. An anchoring group is attached to a preformed polymer. In turn, this anchoring group reacts with the surface hydroxyl groups and the brush is formed.

Hence, a first step 12 of the SI-ATRP process according to aspects of the present disclosure involves grafting an anchoring group within pores of the first mesoporous layer 21. The anchoring group and/or the material or structure of the second layer 22 is so selected that it will advantageously prevent the anchoring group from grafting on the second layer 22. The anchoring group is advantageously grafted on the walls of the pores inside the first layer 21.

The anchoring group must be attached covalently in an advantageously stable manner. Examples of suitable anchoring groups for $TiO_2/ZrO_2$ material are phosphonic acid anchoring groups, and Grignard reagents (organomagnesium reagents), known to furthermore be stable. Introducing a Grignard reagent as anchoring group can for example be performed using the FunMem® technology disclosed in the earlier VITO patent WO2010106167. Additional examples of anchoring groups are catechol, salicylic and phthalic acid derivatives, known to be fairly stable on $TiO_2$.

More particularly, the anchoring group is a phosphonic acid group, a Grignard reagent, a catechol, a salicylic acid group, a carbohydrate or a phthalic acid group; advantageously a phosphonic acid group, a Grignard reagent, a salicylic acid group, or a phthalic acid group; advantageously a phosphonic acid group or a Grignard reagent.

As an example of step 12, grafting of aminopropylphosphonic acid as functionalized anchoring group on the surface of a $TiO_2$ mesoporous material is shown in the reaction scheme below:

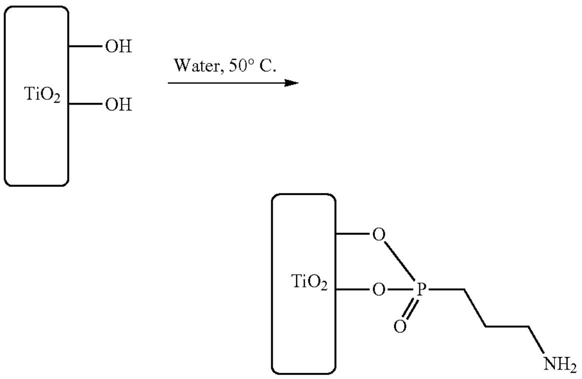

In a next step 13, the anchoring group is covalently linked to an initiator configured to initiate the polymerization reaction (SI-ATRP). One example of a useful initiator precursor is BIBB (α-bromoisobutyryl bromide), another example of a suitable initiator is EBIB (ethyl 2-bromoisobutyrate). Evidently, initiators known in the art for SI-ATRP can be used. Besides BIBB and EBIB, suitable initiators include the following structures:

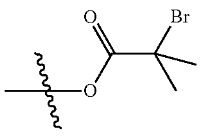 [SMILES: *OC(=O)C(C)(C)Br]

2-bromo-2-methylpropanoate derivatives (α-bromoisobutyrate)

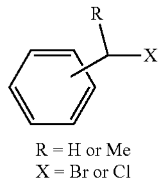

R = H or Me
X = Br or Cl m,p-halogenobenzyl derivatives

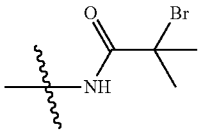 [SMILES: *NC(=O)C(C)(C)Br]

2-bromo-2-methylpropanamide derivatives

As an example of step 13, the reaction scheme of covalently attaching α-bromoisobutyryl as initiator to the anchoring group (grafted on the surface of a $TiO_2$ mesoporous material in the previous step 12) is shown below, obtaining an activated ceramic surface that could be used in a SI-ATRP process:

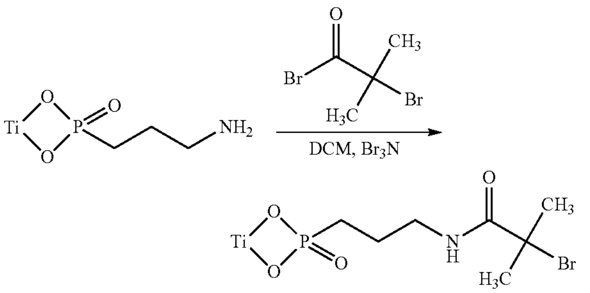

The mesoporous material is to be chosen to ensure a good diffusion and an homogeneous distribution of the tethered initiator on the pore wall and the top layer of the first mesoporous layer 21.

Alternatively to steps 12 and 13 described above, the initiator linked to a phosphonic acid/ester can first be prepared and purified after which the resulting compound can be grafted to the ceramic membrane in one single step.

In a next step 14, the thus treated mesoporous material is prepared for subjecting to a polymerization reaction. Preparation includes impregnation of the porous structure 20 as obtained from step 13 with a monomer in a suitable solvent. Examples of suitable monomers for SI-ATRP include, but are not limited to, styrene, methylacrylate, N-Vinylformamide, Vinyl-2-pyrrolidone, MMA, BMA, MES, 3-Sulfopropyl methacrylate, Aminoethyl methacrylate, Aminoacid-substituted acrylate, N-(3-sulfopropyl)ammonium betain, Allyl glucoside, D-Gluconamidoethyl methacrylate, and the like. Examples of suitable solvents are DMF, Anisole, ethyl acetate and Toluene.

Advantageously, the entire porous structure 20 is impregnated with monomer/solvent combination. Advantageously, the dispersion and/or diffusion of monomer throughout the structure need not to be particularly controlled, since the control where the polymerization will take place is made in the polymerization step.

In step 15, the polymerization reaction is carried out. Suitable polymerization reactions are ones that are carried out in presence of a catalyst.

Advantageously, the first mesoporous layer is present on an external surface of the second porous layer, and the catalyst is passed from the second porous layer towards the first mesoporous layer.

Advantageously, polymerization reactions will stop when the catalyst is deactivated and/or removed. This allows to easily control where and when the polymerization is to take place.

The catalyst is advantageously one which can be deactivated, in particular through supply of (or by flushing the porous structure 20 with) a deactivating agent, e.g. oxygen.

Advantageously, suitable polymerization reactions in aspects of the present disclosure include, but are not limited to, the polymerization of Acrylate, Methacrylate, Methacrylamide, Methylmethacrylate (MMA), Butylmethacrylate (BMA), acrylamide, Acrylic acid, Methacrylic acid, Vinylsulfonic acid, Vinylphosphonic acid, 3-Sulfopropyl methacrylate, (Methacryloyloxy)ethyl succinate (MES), Aminoethyl methacrylate, Aminoacid-substituted acrylate, Methacryloyl-2-hydroxypropane, N-Vinylformamide, Vinyl-2-pyrrolidone, N-Vinylcaprolactam, Diethyleneglycolmethacrylate, Methoxydiethyleneglycol-methacrylate, Methoxyldiethyleneglycolmethacrylate, Triethyleneglycolmethacrylate, Tetraethyleneglycolmethacrylate, Methoxyltetraethyleneglycolmethacrylate, Polyethyleneglycolmethacrylate, Methoxypolyethyleneglycolmethacrylate, Diethyleneglycolacrylate, Methoxydiethyleneglycolacrylate, Triethyleneglycolacrylate, Methoxyldiethyleneglycolacrylate, N-(3-sulfopropyl) ammonium betain, Allyl glucoside, D-Gluconamidoethyl methacrylate, D-Gluconamidoethyl acrylate, sugar-substituted acrylates, sugar-substituted methacrylates, styrenic derivatives, such as styrene, alpha-methylstyrene and alpha-chlorostyrene, or pyridine-substituted styrene derivatives.

Advantageously, suitable catalysts for performing (or for use in) polymerization reactions in aspects of the present disclosure are PMDETA (N,N,N',N',N"-Pentamethyldiethylenetriamine), bpy: 2,2'-bipyridine, dNbpy: 4,4'-Di-5-nonyl-2,2'-bipyridine, TREN: tris(2-aminoethyl)amine, or Me6TREN: Tris(2-dimethylaminoethyl)amine.

As an example of step 15, the reaction scheme of a surface-initiated polymerization of styrene on the top layer and inside the pores of the first mesoporous layer 21 is shown below:

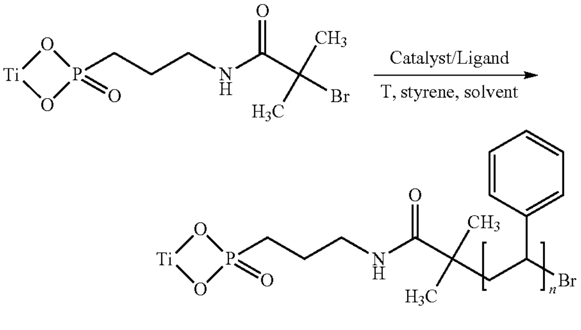

Advantageously, a feed comprising the catalyst is passed through the support structure during the polymerisation reaction, wherein a flow rate of the feed through the support structure is monitored during the polymerization reaction, and wherein a deactivating agent configured to deactivate the catalyst is injected when the flow rate reaches a predetermined threshold.

The feed comprising the catalyst is advantageously passed through the support structure 20 by injecting it from the second layer 22 such that the catalyst flows towards and advantageously through the mesoporous layer 21. Alternatively, or in addition the feed comprising the catalyst can be passed in the opposite direction through the support structure 20, in particular by injecting it from the mesoporous layer 21 such that the catalyst flows towards the second layer 22. The feed can be injected from the side (e.g. the external surface) of mesoporous layer 21 opposite the side 23 interfacing with the second layer 22. The feed comprising the catalyst can be passed through the support structure 20 from both sides (towards interface 23) simultaneously or alternatingly to obtain converging or alternating flow directions of the feed through the mesoporous layer 21, respectively.

More advantageously, passing the catalyst comprises injecting the catalyst at a side of the support structure opposite the mesoporous layer to obtain a concentration gradient, and wherein the catalyst is let to diffuse through the mesoporous layer under action of the concentration gradient; in particular from the second layer towards the first mesoporous layer.

Advantageously, the polymerization reaction of step 15 is performed in a module, the module being a membrane functionalization reactor where the lumen of the membrane (advantageously, tubular membrane) is separated from the outside of the membrane (permeate side). The solvent and the monomer can for example be added in the membrane reactor at both sides of the membrane (permeate and retentate), impregnating the membrane with the monomer inside the pores. The polymerization reaction of step 15 can for instance be performed in a stainless steel module equipped with solvent resistant O-rings.

With the method of the present disclosure, commercially available (often relatively inexpensive) ultrafiltration ceramic membrane (5 nm onwards) can be transformed into nanofiltration membranes with tailor-made surface-pores properties, such as but not limited to charge, hydrophobic vs. hydrophilic, aromatic, chiral, dense, hybrid etc. Depending on the desired properties, several ways of performing the polymerization reaction in the module are possible as described below.

Figure 3:
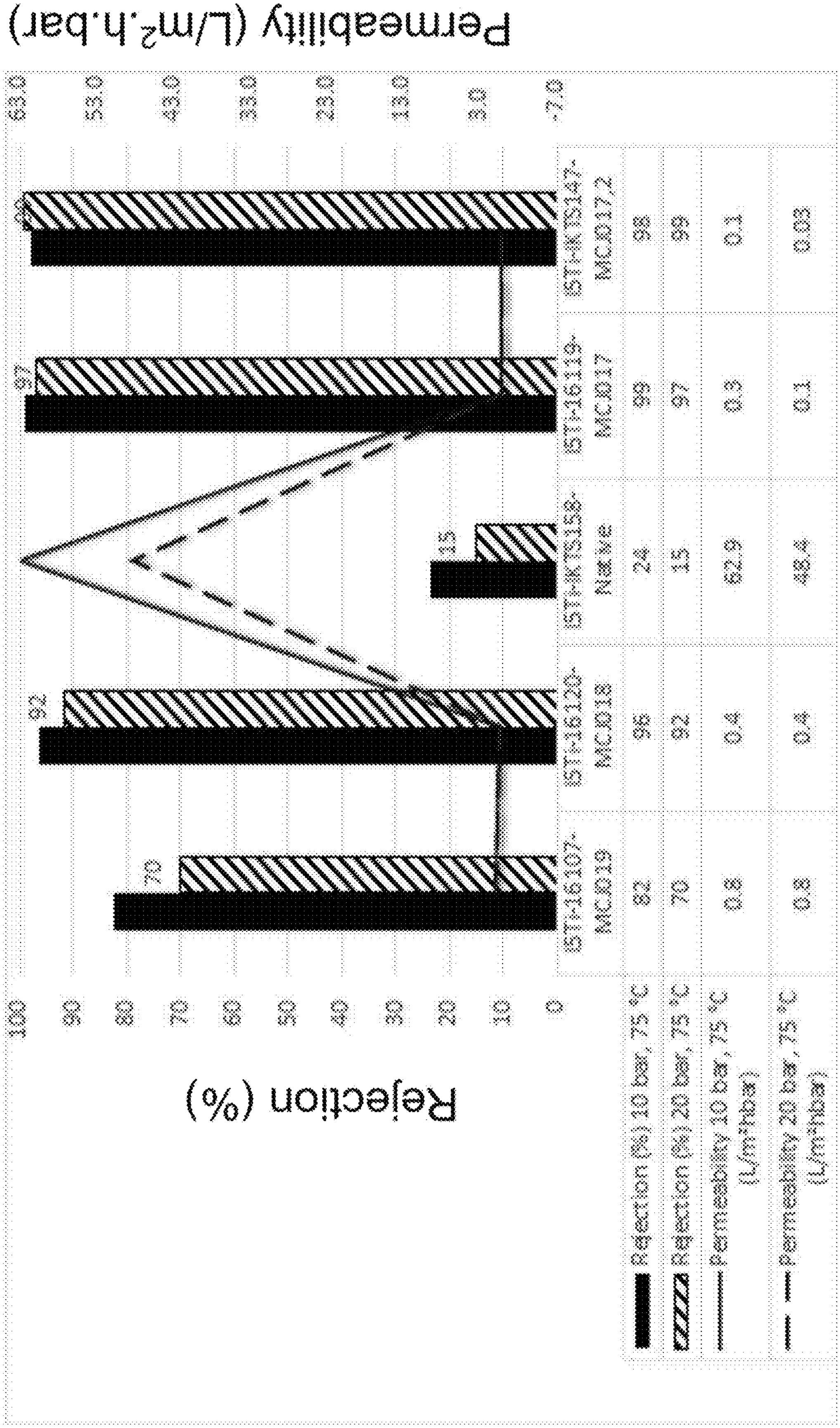
FIG. 3 schematically shows the rejection of DPA (diphenylanthracene MW=330) in toluene @ 75° C. by membranes prepared according to a method of the present disclosure, compared with the rejection by a native membrane.

Advantageously, after the impregnation step, the catalyst, and optionally a sacrificial (free) initiator as for instance EBIB, and a reducing agent, such as but not limited to $[Sn(EH)_2]$ in order to (re) generate the active transition metal complex by reduction of the higher oxidation state transition metal complex, are added. These reagents are added at both sides of the membrane (lumen and outside). In this case, the membrane reactor is sealed and agitated to ensure the mixing. The temperature is used to ensure a good diffusion of the reagents and to be above the glass-transition temperature $T_g$ of the formed polymer which insures the polymer not being glassy. The soft and flexible polymer can swell and ensures the diffusion of the monomers and the catalyst within the pores during the propagation step (polymer growth). This technique enables to grow the polymer inside the pores till obtaining a dense material. Furthermore, the growth would have entropically more chance to be then terminated via the combination of two active chain ends. This pseudo "cross-linking" phenomenon is more likely to occur within the pores due to confinement and will result in a more stable hybrid material. Alternatively, the polymerization reaction is performed at lower temperature which will enable the shrinking of the pores but not necessary till obtaining the dense material. Playing with concentration, time and temperature, the functionalization could be controlled as shown in FIG. 3 depicting the rejection of DPA (diphenylanthracene MW=330) in toluene @ 75° C. by membranes prepared according to a method of the present disclosure: MCJ019, 100° C., 1.4 M of monomer, 20 h; MCJ018, 100° C., 4.3 M of monomer, 4 h; MCJ017 (both membranes), 100° C., 4.3 M of monomer, 20 h; compared to a native (non-functionalized) membrane. From the results depicted in this figure, it is clearly shown that membranes obtained using a method of the present disclosure have the capacity of substantially completely retaining DPA (95 to 99% rejection), depending on the reaction conditions, whereas the native membrane only retains 15 to 25% of DPA. Accordingly, the permeability of the membranes obtained using a method of the present disclosure is substantially lower compared to the native membrane, as shown in FIG. 3 as well.

In another alternative, after the impregnation step, the catalyst (and catalyst reduction agent and the free initiator as e.g., EBIB) are added only at the permeate side (outside). The reaction is initiated directly from the pores. Through the concentration gradient, the catalyst goes through the pores till the top layer. It enables a controlled growth inside the pores while limiting the functionalization of the top-layer which should lead to a nanofiltration membrane presenting low MWCO with higher fluxes.

In yet another alternative a "dummy" is used, i.e. a stainless steel element, which fits perfectly the tubular lumen, is placed with the membrane inside the reactor. The solvent and the monomer are added in the membrane reactor at both sides of the membrane (permeate and retentate) and the membrane is thus impregnated with the monomer inside the pores. The dummy is then placed and the catalyst (and catalyst reduction agent and the free (sacrificial) initiator as e.g. EBIB) are added only at the permeate side (outside). The polymerization takes then only place in the pores letting the outer top-layer unmodified.

Figure 4:
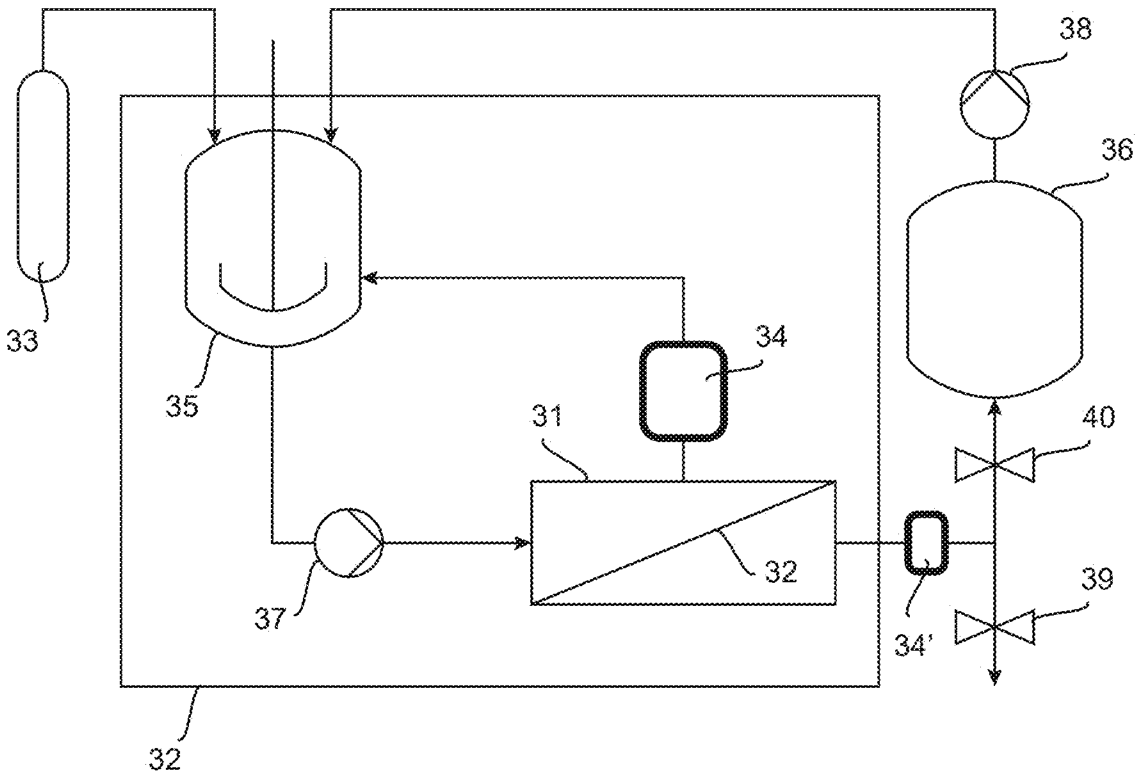
FIG. 4 schematically represents a diagram of a set-up for performing a polymerization reaction according to an embodiment of the present disclosure.

A further alternative uses a filtration unit 32 where the membrane reactor 31 and membrane 30 is placed. FIG. 4 schematically represents a diagram of such a set-up, the reference numerals therein illustrating the following features: membrane 30, membrane reactor (membrane unit) 31, filtration unit 32, inert gas 33, mass-flow meters 34 and 34', feed tank 35, diafiltration tank 36, pumps 37 and 38, valves 39 and 40. Referring to this figure, the filtration unit 32 is equipped with a circulating pump 37 and the pressure is provided with inert gas 33 (Ar or $N_2$). The monomer solution (from feed tank 35) is first circulated at a pressure between 0.1 and 20 bar. The membrane 30 is set in such a way that the solution circulates from the permeate side through the pores to reach the lumen of the tubular shaped membrane. The bleed is then added back to the feed to ensure the re-use of all the solutes present in the solution. Solution not yet permeated is circulated back to the feed. It ensures a closed system where all the reagents are continuously circulated without the need to add extra reagent during the process. After this impregnation step, the catalyst is introduced in the feed side. The reaction mixture is circulated as described above. The polymer growth will first occur within the pores. A process analytical tool could be implemented: a mass-flow meter 34 is placed at the bleed side. When the polymerization occurs, the flow is declining due to the shrinkage of the pores. The mass-flow meter 34 will detect the variations in flux giving an in-situ status of the modification. When a certain flux is obtained, the functionalization reaction could be immediately stopped by opening the system. The air will deactivate the catalyst. If a more tight membrane is desired, a higher pressure could be set to increase the flux and ensure the good circulation of the reagents. It will enable the polymer chains to grow further till having the expected properties.

A controlled application of SI-ATRP on $TiO_2/ZrO_2$ mesoporous membranes according to aspects of the present disclosure advantageously enables to decrease the MWCO (molecular weight cut-off) e.g., to 1500 Da or less, and to play with affinity separation (through a diffusion transport mechanism and not a convexion phenomenon through a pore) while having a thermal and chemical resistant robust ceramic bulk material. As a result, hybrid organic solvent nanofiltration membranes are obtained that can be used in processes with a broad temperature range, especially at higher temperatures which most of the commercially available membranes cannot afford. The swelling effect which is present with polymeric material is advantageously considerably reduced in the membranes thanks to the ceramic scaffold. The commercial availability of numerous monomers from which the polymerization can be made enables the synthesis of a countless number of new membranes with tailor-made properties.

According to another aspect of the present disclosure, there is provided a nanofiltration membrane comprising a porous support and a nanofiltration layer attached to the porous support, wherein the nanofiltration layer comprises a matrix made of $TiO_2$ and/or $ZrO_2$, wherein the porous support is made of a material different from $TiO_2$ and/or $ZrO_2$, the matrix enclosing volumes of mesoporous size at least partially filled with a polymer which is covalently linked to the matrix.

Advantageously, the porous support of the nanofiltration membrane is made of a ceramic material, in particular aluminum oxide.

Advantageously, the polymer extends as brushes from the matrix into the volumes of mesoporous size.

Advantageously, the nanofiltration layer is dense. Alternatively, the volumes of mesoporous size are partially void.

Advantageously, the porous support of the nanofiltration membrane is free of polymer.

Advantageously, the nanofiltration membrane is tubular. More advantageously, the nanofiltration membrane comprises a lumen and an internal wall interfacing the lumen, wherein the nanofiltration layer extends from the internal wall towards the external surface.

Figure 5:
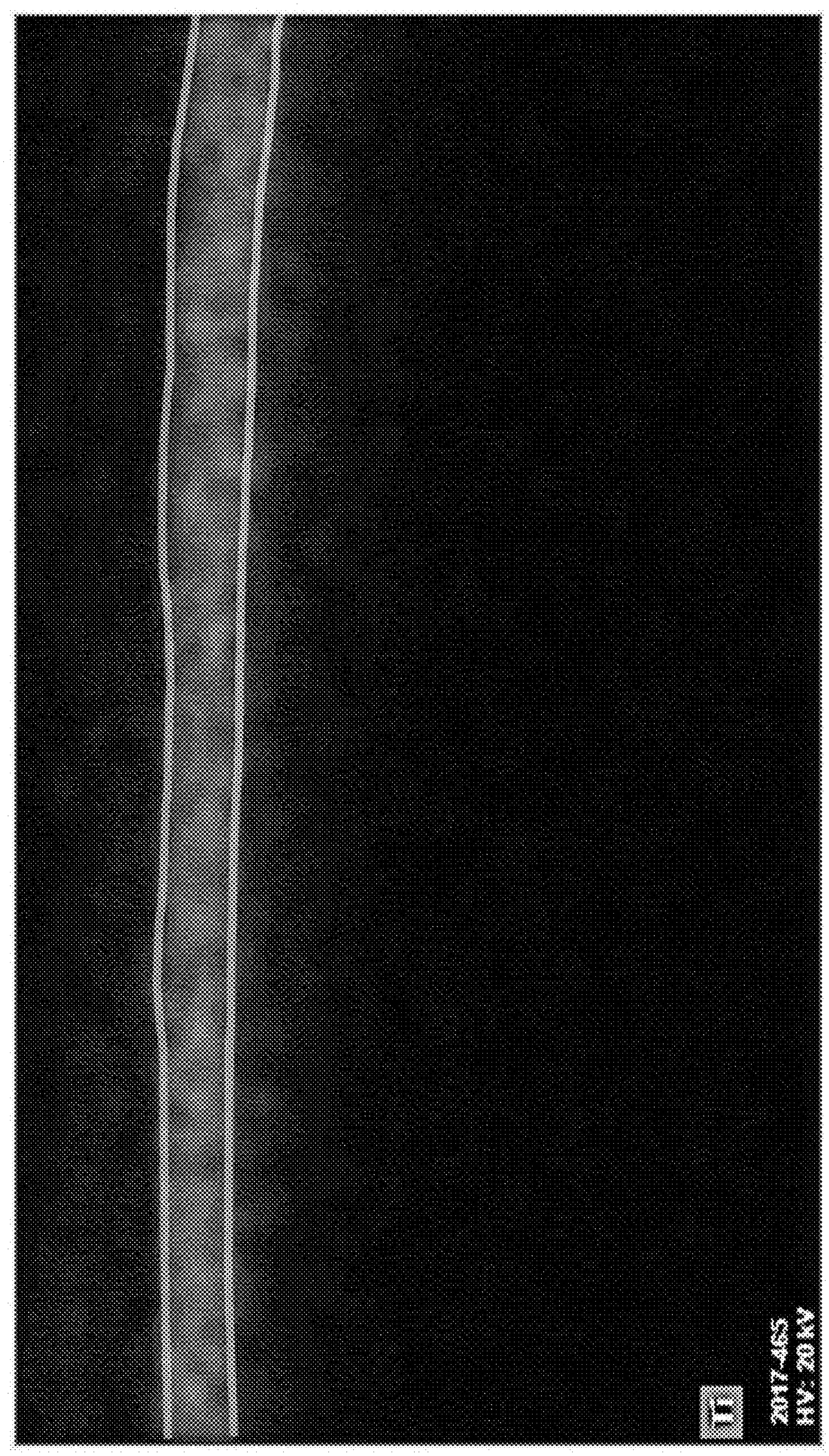
FIG. 5 is an EDX picture of a transversal view of a membrane according to the present disclosure, showing the mesoporous TiO2 layer.
Figure 6:
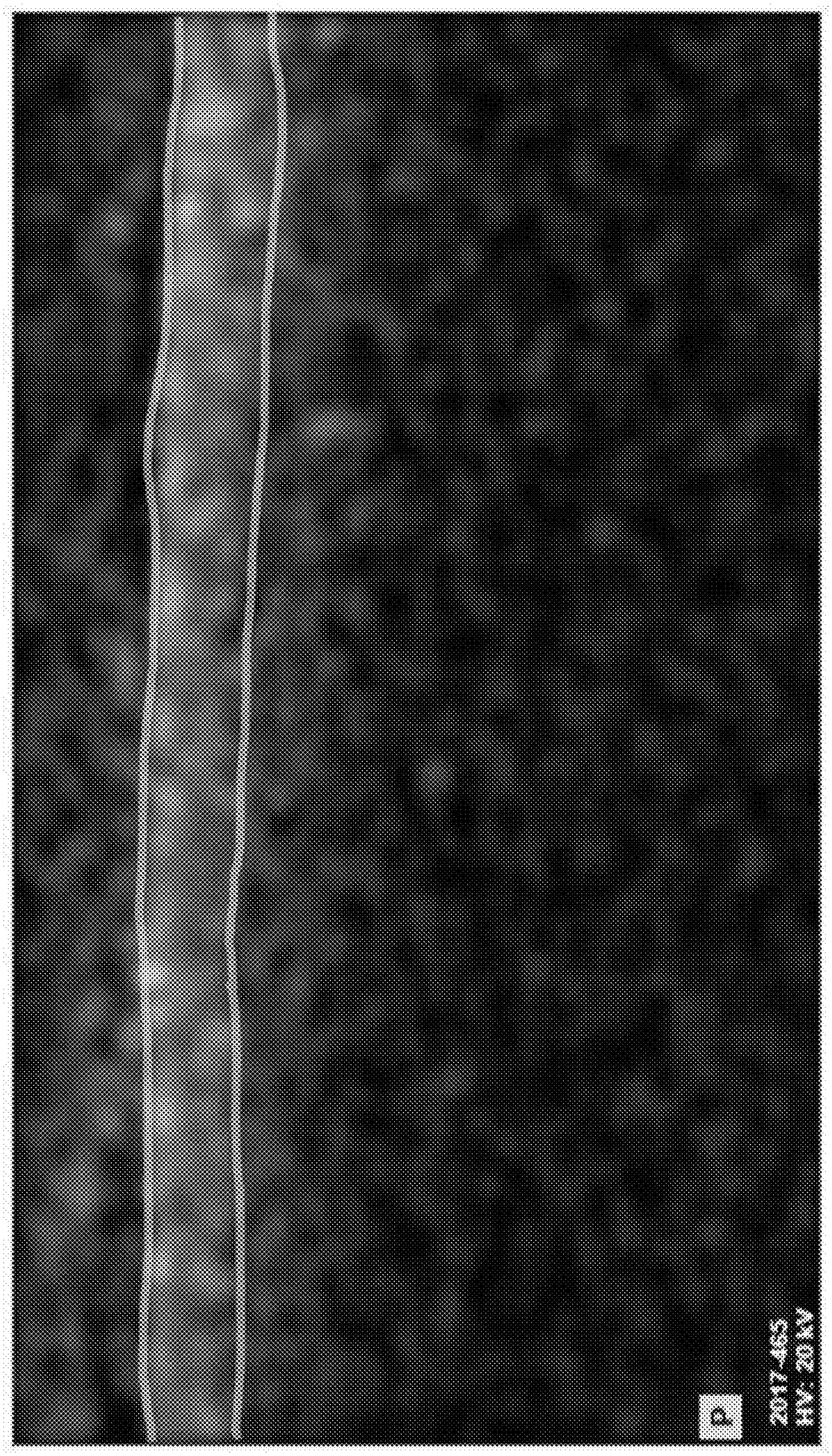
FIG. 6 is an EDX picture of a transversal view of a membrane according to the present disclosure, showing a phosphonic acid anchoring group attached to the mesoporous layer of FIG. 5 using the method of the present disclosure.

FIG. 5 and FIG. 6 are EDX pictures of a transversal view of a membrane according to the present disclosure. Suitable procedures for obtaining EDX pictures will be apparent for those skilled in the art. For obtaining FIGS. 5 and 6, for example, scanning electron microscope (SEM) with energy dispersive X-ray (EDX) analysis was performed with a JEOL JSM-6340F microscope, which was operated at an acceleration voltage of 20 kV. FIGS. 5 and 6 clearly show, respectively, the mesoporous $TiO_2$ layer (FIG. 5), and how a phosphonic acid anchoring group (FIG. 6) is nicely confined to this mesoporous layer using the method of the present disclosure.

Nanofiltration membranes according to aspects of the present disclosure are particularly useful for nanofiltration and pervaporation applications, in particular where elevated temperatures occur and/or where a good chemical resistance is required.

EXPERIMENTS

Experiment 1. Aminopropyl phosphonic acid Modification

Aminopropyl phosphonic acid (0.11 g, 10 mM) was dissolved in RO water (80 mL) and stirred at room temperature for 5 minutes. The membrane (I5Ti16119-SG2123, this is a 12 cm long single tubular commercial membrane structured as in FIG. 2, with a $TiO_2$ mesoporous layer 21 having 5 nm pores, on top of an $Al_2O_3$ second, porous, layer 22; the membrane having a membrane surface of about 20 $cm^2$) was placed in a T-reactor (equipped with a stirrer) and then, the reaction mixture was poured into it. The T-reactor was covered with a heating-jacket, a thermometer was placed inside the solution and the mixture was stirred at 50° C. for 4 h. Then, the solution was taken out carefully and the reactor+membrane rinsed with RO $H_2O$ (×2): RO water (80 mL) was added to the T-reactor and it was let stirred at room temperature for 30 minutes. RO water (80 mL) was then added to the T-reactor for the third time and it was let stirred at room temperature overnight.

Then, the membrane was taken out and it was dried in the oven at 100° C. for 2 h. Afterwards, it was cooled down at room temperature.

The membrane was dried in the vacuum line ($10^{-4}$ mbar) at 65° C. for 2 h.

Experiment 2. α-bromoisobutyryl bromide Modification

The membrane as obtained from Experiment 1 was placed in the T-reactor and flushed with nitrogen to insure the inertization of the reaction vessel and cool-down of the membrane. α-bromoisobutyryl bromide (1.84 g, 0.1 M) was dissolved in DCM (80 mL) and was poured into the T-reactor. The system was cooled down to 0° C. with an ice-bath and then, $Et_3N$ (1.05 g, 0.13 M) was added dropwise under $N_2$ atmosphere. The T-reactor was closed, nitrogen was flushed through it for 10 minutes and then the system was completely closed. The reaction was made to proceed overnight while stirring.

After 20 h reaction duration, the color of the solution was brown. The solution was discarded and the membrane+reactor system rinsed twice with DCM. DCM (80 mL) was added to the system and was let stir for 4 h. DCM (80 mL) was added again and was let stir for 20 h.

The colorless DCM solution was removed from the T-reactor. The membrane is then rinsed twice with 30 ml of DCM. The membrane was taken out of the module and was let dry in the fume hood at room temperature.

TABLE 1

| Component | MW (g/mol) | V (mL) | C (mol/L) | M (g) |
|---|---|---|---|---|
| α-bromoisobutyryl bromide | 229.9 | 80 | 0.1 | 1.83 |
| Triethylamine | 101.19 | 80 | 0.13 | 1.05 |

Experiment 3. SI-ATRP Polymerization Using Styrene as Monomer

Membranes obtained with experiment 2 were subjected to SI-ATRP using styrene as a monomer under different reaction conditions.

Experiment 3.1

TABLE 2

| Reagent | Eq | mmol | MW (g/mol) | Mass (g) | Real Mass (g) | Volume (mL) |
|---|---|---|---|---|---|---|
| $CuCl_2$ | 1 | 0.3 | 134.45 | 0.040 | 0.042 | |
| PMDETA | 1 | 0.3 | 173.3 | 0.052 | 0.053 | |
| $[Sn(EH)_2]$ | 0.5 | 0.15 | 405.12 | 0.061 | 0.075 | |

TABLE 2-continued

| Reagent | Eq | mmol | MW (g/mol) | Mass (g) | Real Mass (g) | Volume (mL) |
|---|---|---|---|---|---|---|
| EBIB | 1 | 0.3 | 195.05 | 0.059 | 0.077 | |
| Styrene (4.3M) | 216 | 65.24 | 104.15 | | (in 20 mL) | 7.5 |
| DMF | | | | | | 7.5 |

The glass-ware and the module was dried at 100° C. during the night. A cleaned balance together with a cleaned stirring plate were introduced into the glove box. The membrane of experiment 2 was dried in the vacuum line for 2 h.

The dried membrane was placed in a stainless steel tubular membrane module along with two solvent resistant "O-rings". EBIB (0.077 g) was dissolved in DMF (10 mL) and then, styrene (10 mL) was added. After stirring the solution for 5 minutes, it was poured into the module with a Pasteur pipette (first the inside of the membrane and then the outside). A total amount of 15 mL of solution was needed to fill the whole module. The module was closed and left in horizontal position during 2 h.

[Sn(EH)2] (0.075 g) was weighted in a beaker and dissolved in the solution of inside the module (2 Pasteur pipettes). Afterwards, it was added to the module (half of the solution to the inside part of the membrane and the other half to the outside). The module was closed and shaken a little bit.

$CuCl_2$ (0.042 g) and PMDETA (0.053 g) were weighed in a beaker and dissolved with the solution of inside the module (2 Pasteur pipettes). The solution turned blue. Afterwards, the solution was added to the module (half of the solution to the inside part of the membrane and the other half to the outside). The module was closed and shaken a little bit.

Finally, the module was taken out from the glovebox and was heated with the heating jacket to 110° C., in horizontal position, for 20 h.

After 20 h, the system was opened to the air and the solution was taken out from the module (green solution). The membrane was placed in a T-reactor and was rinsed with DMF (×2): DMF (80 mL) was added and it was let stirred for 1 h. Then, the solution was removed and the T-reactor containing the membrane was rinsed with water (×2): Water (80 mL) was added and was let to stir for 20 minutes.

The membrane was placed in a stainless steel tubular membrane module along with two solvent resistant "O-rings" and was washed with DMF in a dead-end mode using nitrogen as source of pressure at 5 bars. After ca 20 mL of permeate was obtained the membrane was taken out from the module.

The membrane was washed with DMF (80 mL) overnight in a T-shaped tube. It was washed afterwards with water (3×80 mL) for an hour, each washing.

The membrane was cleaned with water in the cross-flow system at 5 bars.

Membrane Characterization:

Water flux. Membrane was dried by vacuum, at 65° C. for 2 h (just before permporometry)

Permporometry

Experiment 3.2

TABLE 3

| Reagent | Eq | mmol | MW (g/mol) | Mass (g) | Real Mass (g) | Volume (mL) |
|---|---|---|---|---|---|---|
| $CuCl_2$ | 1 | 0.3 | 134.45 | 0.040 | 0.041 | |
| PMDETA | 1 | 0.3 | 173.3 | 0.052 | 0.060 | |
| $[Sn(EH)_2]$ | 0.5 | 0.15 | 405.12 | 0.061 | 0.063 | |
| EBIB | 1 | 0.3 | 195.05 | 0.059 | 0.076 (in 20 mL) | |
| Styrene (4.3M) | 216 | 65.24 | 104.15 | | | 7.5 |
| DMF | | | | | | 7.5 |

The glass-ware and the module was dried at 100° C. during the night. A cleaned balance together with a cleaned stirring plate were introduced into the glove box. The membrane was dried in the vacuum line for 2 h.

The dried membrane was placed in a stainless steel tubular membrane module along with two solvent resistant "O-rings". EBIB (0.076 g) was dissolved in DMF (10 mL) and then, styrene (10 mL) was added. After stirring the solution for 5 minutes, it was poured into the module with a Pasteur pipette (first the inside of the membrane and then the outside). A total amount of 15 mL of solution was needed to fill the whole module. The module was closed and left in horizontal position during 2 h.

$[Sn(EH)_2]$ (0.063 g) was weighed in a beaker and dissolved in the solution of inside the module (2 Pasteur pipettes). Afterwards, it was added to the module (half of the solution to the inside part of the membrane and the other half to the outside). The module was closed and shaken a little bit.

$CuCl_2$ (0.041 g) and PMDETA (0.060 g) were weighed in a beaker and dissolved with the solution of inside the module (2 Pasteur pipettes). The solution turned blue. Afterwards, the solution was added to the module (half of the solution to the inside part of the membrane and the other half to the outside). The module was closed and shaken a little bit.

Finally, the module was taken out from the glovebox and was heated with the heating jacket to 110° C., in horizontal position, for 4 h. After this time, the system was opened to the air and the solution was taken out from the module (green solution). The membrane (active part was blue) was placed in a T-reactor and was rinsed with DMF (×2). DMF (80 mL) was added and it was let to stir overnight.

The solution turned blue and the membrane was totally cleaned (white). The solution was removed and the T-reactor was rinsed with DMF (×2) and then DMF was added again and was let stir for 1 h. Then, the solution was removed and the T-reactor was rinsed with water (×2). Water (80 mL) was added and was let to stir for 2 h, twice. Then, the membrane was dried at room temperature.

Membrane Characterization:

Water flux. Membrane was dried by vacuum, at 65° C. for 2 h (just before permporometry)

Permporometry

Experiment 3.3

TABLE 4

| Reagent | Eq | mmol | MW (g/mol) | Mass (g) | Real Mass (g) | Volume (mL) |
|---|---|---|---|---|---|---|
| $CuCl_2$ | 1 | 0.09 | 134.45 | 0.0121 | 0.0130 | |
| PMDETA | 1 | 0.09 | 173.3 | 0.0156 | 0.0196 | |
| $[Sn(EH)_2]$ | 0.5 | 0.05 | 405.12 | 0.0203 | 0.0216 | |
| EBIB | 1 | 0.0 | 195.05 | 0.0 | 0.0325 (in 21 mL) | |
| Styrene (1.4M) | 216 | 20 | 104.15 | | | 2.3 |
| DMF | | | | | | 11.7 |

The glass-ware and the module was dried at 100° C. during the night. A cleaned balance together with a cleaned stirring plate were introduced into the glove box. The membrane was dried in the vacuum line for 2 h.

The dried membrane was placed in a stainless steel tubular membrane module along with two solvent resistant "O-rings". EBIB (0.0325 g) was dissolved in DMF (17.5 mL) and then, styrene (3.5 mL) was added. After stirring the solution for 5 minutes, it was poured into the module with a Pasteur pipette (first the inside of the membrane and then the outside). A total amount of 14 mL of solution was needed to fill the whole module. The module was closed and left in horizontal position during 2 h.

$[Sn(EH)_2]$ (0.0216 g) was weighed in a beaker and dissolved in the solution of inside the module (2 Pasteur pipettes). Afterwards, it was added to the module (half of the solution to the inside part of the membrane and the other half to the outside). The module was closed and shaken a little bit.

$CuCl_2$ (0.0130 g) and PMDETA (0.0196 g) were weighed in a beaker and dissolved with the solution of inside the module (2 Pasteur pipettes). The solution turned blue. Afterwards, the solution was added to the module (half of the solution to the inside part of the membrane and the other half to the outside). The module was closed and shaken a little bit.

Finally, the module was taken out from the glovebox and was heated with the heating jacket to 110° C., in horizontal position, for 20 h.

After 20 h, the system was opened to the air and the solution was taken out from the module (green solution). The membrane was placed in a T-reactor and DMF (80 mL) was added and it was let stirred for 4 h. The solution was removed (blueish) and DMF was added again and was let stirred overnight.

The solution was colorless and the membrane was white. The solution was removed and the T-reactor was rinsed with water (×2). Water (80 mL) was added and was let to stir for 2 h, twice. Then, the membrane was dried at room temperature.

Membrane Characterization:

Water flux. Membrane was dried by vacuum, at 65° C. for 2 h (just before permporometry)

Permporometry

Membrane Characterization

The following tests were performed both on the modified and the unmodified membranes.

Permeability

The water flux and permeability are determined before and after modification. A change in these parameters is an indicator of an altered surface. The difference in measurements may be the result of a change in hydrophobicity or the closing of the pores due to extensive polymerization. To better understand the generated data, permporometry will be performed.

A solvent flux will also be tested using these membranes. Any change in behavior will be favorable.

Membrane Fluxes membrane experiment 3.1: styrene, DMF, 1:1, 20 h

TABLE 5

| Water permeability unmodified ($l/m^2 \cdot h \cdot bar$) | Water permeability modified ($l/m^2 \cdot h \cdot bar$) |
|---|---|
| 106 | 0.3 |

TABLE 6

| Applied temp (° C.) | Applied pressure (bar) | Toluene permeability modified ($l/m^2 \cdot h \cdot bar$) |
|---|---|---|
| 25 | 10 | 0.16 |
| 25 | 15 | 0.21 |
| 50 | 15 | 0.43 |
| 50 | 10 | 0.39 |

membrane experiment 3.2: styrene, DMF, 1:1, 4 h

TABLE 7

| Water permeability unmodified ($l/m^2 \cdot h \cdot bar$) | Water permeability modified ($l/m^2 \cdot h \cdot bar$) |
|---|---|
| 107 | 0.3 |

TABLE 8

| Applied temp (° C.) | Applied pressure (bar) | Toluene permeability modified ($l/m^2 \cdot h \cdot bar$) |
|---|---|---|
| 25 | 10 | ND |
| 25 | 15 | ND |
| 50 | 15 | 0.17 |
| 50 | 10 | 0.23 |

Membrane Permporometry

For both modified membranes the membrane permporometry could not be measured as no nitrogen flux was detected (dense material). During permporometry the nitrogen flux through an unmodified membrane as used in the experiments above, measured at low transmembrane pressure (typically 0.1 bar during permporometry measurements) is typically >300 ml/min if the nitrogen flow provided to the membrane is about 1000 ml/min. When the modified membranes of this experiment are measured, the nitrogen flux through the membrane at the same measuring conditions is below the detection limit, being about 5 ml/min. In this case we consider the membrane "dense" i.e. the membrane pores are filled with the grafted polymer. In cases where the flow is above the detection limit at similar measuring conditions, the grafted polymer does not completely fill the pores, but leaves some void space and thus results in a porous membrane with reduced pore size, compared to the unmodified membrane.

Other Reagent Combinations

Other possible reagent combinations are summarized in Table 9 below. [a] Addition order 1: SM, solvent, CuBr, EBIB, Ligand, styrene. Addition order 2: CuBr, Ligand, Solvent, SM, EBIB, styrene. Addition order 3: $CuCl_2$, Ligand, solvent, SM, styrene, $[Sn(EH)_2]$ (if applicable), EBIB. [b]The styrene used in this reaction was probably polymerized due to its high viscosity.

Other Reagent Combinations

TABLE 9

Other possible reagent combinations are summarized in Table 9 below.

| Code | Solvent | Monomer | Ligand | Catalyst | T (° C.) | Solvent: Monomer | Addition order[a] |
|---|---|---|---|---|---|---|---|
| WPC035 | DMF | Styrene (1) | PMDETA | CuBr | 65 | 5:1 | 1 |
| WPC036 | Anisole | Styrene (1) | PMDETA | CuBr | 65 | 5:1 | 1 |
| WPC037 | DMF | Styrene (1) | 2,2'-Bipyridyl | CuBr | 65 | 5:1 | 2 |
| WPC038 | Anisole | Styrene (1) | 2,2'-Bipyridyl | CuBr | 65 | 5:1 | 2 |
| WPC039 | DMF | Styrene (1) | PMDETA | CuBr | 65 | 5:1 | 2 |
| WPC039.2 | DMF | Styrene (3) | PMDETA | CuBr | 65 | 5:1 | 3 |
| MCJ001[b] | Anisole | Styrene (1) | PMDETA | CuBr | 95 | 1:1 | 2 |
| MCJ001.2 | Anisole | Styrene (2) | PMDETA | CuBr | 95 | 1:1 | 3 |
| MCJ002 | Toluene | Styrene (2) | dNbpy | $CuCl_2$, $[Sn(EH)_2]$ | 95 | 1:1 | 3 |
| MCJ002.2 | Toluene | Styrene (3) | dNbpy | $CuCl_2$, $[Sn(EH)_2]$ | 95 | 1:1 | 3 |
| MCJ003 | Anisole | Styrene (2) | $Me_6TREN$ | $CuCl_2$, $[Sn(EH)_2]$ | 95 | 1:1 | 3 |
| MCJ004 | Anisole | Styrene (2) | dNbpy | $CuCl_2$, $[Sn(EH)_2]$ | 95 | 1:1 | 3 |
| MCJ005 | DMF | Styrene (2) | dNbpy | $CuCl_2$, $[Sn(EH)_2]$ | 95 | 1:1 | 3 |
| MCJ006 | DMF | Styrene (2) | $Me_6TREN$ | $CuCl_2$, $[Sn(EH)_2]$ | 95 | 1:1 | 3 |
| MCJ007 | Toluene | Styrene (2) | Me6TREN | $CuCl_2$, $[Sn(EH)_2]$ | 95 | 1:1 | 3 |
| MCJ008 | DMF | Styrene (3) | PMDETA | CuBr | 65 | 1:1 | 2 |
| MCJ009 | DMF | Styrene (3) | PMDETA | CuBr | 95 | 5:1 | 2 |
| MCJ010 | DMF | Styrene (3) | PMDETA | $CuCl_2$, $[Sn(EH)_2]$ | 95 | 5:1 | 3 |
| MCJ012 | DMF | MMA (1) | PMDETA | CuBr | 65 | 5:1 | 3 |
| MCJ013 | DMF | SPMA | 2,2'-Bipyridyl | $CuCl_2$, $[Sn(EH)_2]$ | 65 | 0.5M | 3 |

[a]Addition order 1: SM, solvent, CuBr, EBIB, Ligand, styrene.
Addition order 2: CuBr, Ligand, Solvent, SM, EBIB, styrene.
Addition order 3: $CuCl_2$, Ligand, solvent, SM, styrene, $[Sn(EH)_2]$ (if applicable, EBIB.)
[b]The styrene used in this reaction was probably polymaerized due to its high viscosity.

The invention claimed is:

1. A method of manufacturing a nanofiltration membrane, the method comprising:

providing a support structure comprising a first mesoporous layer and a second porous layer adjacent to the first mesoporous layer, wherein the first mesoporous layer is a layer of ceramic material comprising one or a combination of: $TiO_2$ and $ZrO_2$ and wherein the second porous layer is made of an aluminum oxide;

covalently attaching an anchoring group selected from the group consisting of a phosphonic acid group, a Grignard reagent, a salicylic acid group, a carbohydrate, and a phthalic acid group within pores of the first mesoporous layer, wherein the second porous layer is inert to the covalently attaching step;

subsequent to the covalently attaching, covalently bonding an initiator to the anchoring group, wherein the initiator is configured to initiate a surface-initiated atom transfer radical polymerization reaction and is selected from the group consisting of α-bromoisobutyryl, α-bromoisobutyryl bromide, ethyl 2-bromoisobutyrate, α-bromoisobutyrate, m,p-halogenobenzyl derivatives, and 2-bromo-2-methylpropanamide derivatives;

impregnating an entirety of the support structure, including the first mesoporous layer and the second porous layer, with a monomer and a solvent; and performing a polymerization reaction, comprising passing a feed comprising a catalyst through the first mesoporous layer, the monomer being configured to start the surface-initiated atom transfer radical polymerization reaction by grafting from the initiator in the presence of the catalyst;

wherein passing the feed comprising the catalyst comprises injecting the catalyst at a first side of the support structure from the second porous layer toward the first mesoporous layer to obtain a concentration gradient; and wherein passing the feed comprising the catalyst further comprises diffusing the catalyst through the first mesoporous layer under action of the concentration gradient.

2. The method of claim 1, further comprising deactivating the catalyst by flushing the support structure with a deactivating agent.

3. The method of claim 1, wherein the feed comprising the catalyst is passed through the support structure during the polymerization reaction, wherein a flow rate of the feed through the support structure is monitored during the polymerization reaction, and wherein a deactivating agent configured to deactivate the catalyst is injected when the flow rate reaches a predetermined threshold.

4. The method of claim 1, wherein passing the feed comprising the catalyst comprises injecting the catalyst at a first side of the support structure from the second porous layer towards the first mesoporous layer, and at a second side of the support structure opposite to the first side.

5. The method of claim 2, wherein the first mesoporous layer is present on an external surface of the second porous layer.

6. The method of claim 2, wherein the feed comprising the catalyst is passed through the support structure during the polymerization reaction, wherein a flow rate of the feed through the support structure is monitored during the polymerization reaction, and wherein a deactivating agent configured to deactivate the catalyst is injected when the flow rate reaches a predetermined threshold.

7. The method of claim 2, wherein passing the feed comprising the catalyst comprises injecting the catalyst at a first side of the support structure from the second porous layer towards the first mesoporous layer, and at a second side of the support structure opposite to the first side.

8. The method of claim 1, wherein the catalyst is selected from the group consisting of N,N,N',N',N"-Pentamethyldiethylenetriamine, 2,2'-bipyridine, 4,4'-Di-5-nonyl-2,2'-bipyridine, tris(2-aminoethyl)amine, Tris(2-dimethylaminoethyl)amine, CuBr, CuCl2, and Sn(EH)2.

9. The method of claim 1, wherein the impregnating is subsequent to the covalently bonding.

10. The method of claim 1, wherein the performing the polymerization reaction is subsequent to the impregnating.

11. The method of claim 10, wherein the performing the polymerization reaction is subsequent to the covalently bonding.

* * * * *